(12) United States Patent
Shingu

(10) Patent No.: US 8,921,432 B2
(45) Date of Patent: Dec. 30, 2014

(54) METHOD FOR PRODUCING HYDROCARBONS

(75) Inventor: Masaki Shingu, Tokyo (JP)

(73) Assignees: Japan Oil, Gas and Metals National Corporation, Tokyo (JP); Inpex Corporation, Tokyo (JP); JX Nippon Oil & Energy Corporation, Tokyo (JP); Japan Petroleum Exploration Co., Ltd., Tokyo (JP); Cosmo Oil Co., Ltd., Tokyo (JP); Nippon Steel & Sumikin Engineering Co., Ltd, Tokyo (JP)

( * ) Notice: Subject to any disclaimer, the term of this patent is extended or adjusted under 35 U.S.C. 154(b) by 0 days.

(21) Appl. No.: 14/006,665

(22) PCT Filed: Mar. 15, 2012

(86) PCT No.: PCT/JP2012/056664
§ 371 (c)(1),
(2), (4) Date: Sep. 21, 2013

(87) PCT Pub. No.: WO2012/132920
PCT Pub. Date: Oct. 4, 2012

(65) Prior Publication Data
US 2014/0018449 A1 Jan. 16, 2014

(30) Foreign Application Priority Data

Mar. 28, 2011 (JP) .................................. 2011-069395

(51) Int. Cl.
*C10G 2/00* (2006.01)

(52) U.S. Cl.
CPC ................ *C10G 2/344* (2013.01); *C10G 2/342* (2013.01)
USPC ......................................................... 518/700

(58) Field of Classification Search
CPC ...................................................... C10G 2/344
USPC ......................................................... 518/700
See application file for complete search history.

(56) References Cited

U.S. PATENT DOCUMENTS

2010/0273900 A1* 10/2010 Jacobson et al. .............. 518/712

FOREIGN PATENT DOCUMENTS

| GB | 2403481 A | 1/2005 |
| GB | 2466315 A | 6/2010 |

(Continued)

OTHER PUBLICATIONS

Int'l Search Report issued May 15, 2012 in Int'l Application No. PCT/JP2012/056664.

(Continued)

*Primary Examiner* — Jafar Parsa
*Assistant Examiner* — Amy C Bonaparte
(74) *Attorney, Agent, or Firm* — Panitch Schwarze Belisario & Nadel LLP

(57) ABSTRACT

A method for producing hydrocarbons includes: a synthesis step of synthesizing hydrocarbons by the Fischer-Tropsch synthesis reaction using a slurry bubble column reactor having a slurry containing catalyst particles and liquid hydrocarbons retained inside the reactor, and having a gas phase portion located above the slurry; a discharging step of passing the slurry through a filter positioned inside and/or outside the reactor, thereby separating and discharging the heavy liquid hydrocarbons; a backwash step of flushing liquid hydrocarbons through the filter in the opposite direction to the flow of the slurry, thereby returning the catalyst particles to the reactor; and a cooling and gas-liquid separation step of cooling the hydrocarbons discharged from the gas phase portion, and then separating and collecting the condensed light liquid hydrocarbons. The liquid hydrocarbons flushed through the filter in the backwash step include the light liquid hydrocarbons obtained in the cooling and gas-liquid separation step.

3 Claims, 4 Drawing Sheets

(56) References Cited

FOREIGN PATENT DOCUMENTS

| | | |
|---|---|---|
| JP | 2007-516065 A | 6/2007 |
| JP | 2010-536979 A | 12/2010 |
| WO | 2005005038 A1 | 1/2005 |
| WO | 2007041726 A1 | 4/2007 |
| WO | 2009027914 A2 | 3/2009 |

OTHER PUBLICATIONS

Extended European Search Report issued Sep. 30, 2014 in EP Application No. 12765832.6.

* cited by examiner

METHOD FOR PRODUCING HYDROCARBONS

CROSS-REFERENCE TO RELATED APPLICATION

This application is a Section 371 of International Application No. PCT/JP2012/056664, filed Mar. 15, 2012, which was published in the Japanese language on Oct. 4, 2012, under International Publication No. WO 2012/132920 A1, and the disclosure of which is incorporated herein by reference.

TECHNICAL FIELD

The present invention relates to a method for producing hydrocarbons by the Fischer-Tropsch synthesis reaction using a slurry bubble column reactor.

Priority is claimed on Japanese Patent Application No. 2011-069395, filed Mar. 28, 2011, the content of which is incorporated herein by reference.

BACKGROUND ART

As a method for producing hydrocarbons having a broad carbon number distribution, which can be used as feedstocks for liquid fuel products such as kerosene and gas oil, methods that employs the Fischer-Tropsch synthesis reaction (hereinafter also abbreviated as the "FT synthesis reaction"), which uses carbon monoxide gas (CO) and hydrogen gas ($H_2$) as a feedstock, are already well known. Moreover, techniques which use natural gas or the like as a feedstock to produce a synthesis gas (a mixed gas containing CO and $H_2$ as the main components) via a reforming process, subsequently use the FT synthesis reaction to synthesize hydrocarbons from the synthesis gas, and then subject these hydrocarbons to hydrotreating and fractional distillation to produce liquid fuels are known as GTL (Gas to Liquids) processes.

Patent Document 1 discloses one example of a method for producing hydrocarbons by the FT synthesis reaction, the method using a slurry bubble column reactor in which a synthesis gas is blown through a slurry prepared by suspending solid catalyst particles within a liquid hydrocarbon (hereinafter simply referred to as "the slurry") to effect the FT synthesis reaction.

In this method, the hydrocarbons are produced using a reaction system that includes a reactor (slurry bubble column reactor), which houses the slurry and in which the FT synthesis reaction is performed, a supply line (gas supply section) that blows the synthesis gas into the bottom of the reactor, a filter that separates the catalyst particles from the slurry from inside the reactor, a discharge line for discharging the hydrocarbons (heavy liquid hydrocarbons) that have been synthesized inside the reactor and passed through the filter, and a mechanism that returns, to the reactor, a portion of the liquid hydrocarbons discharged through the discharge line, thereby washing the filter.

Further, the above mechanism for washing the filter, namely the mechanism for returning to the slurry the accumulated catalyst particles trapped by the filter, typically employs a backwash treatment in which a portion of the liquid hydrocarbons (heavy liquid hydrocarbons) that have been filtered through the filter and discharged through the discharge line is caused to flow back through the filter in the opposite direction to the flow direction during filtering of the slurry.

On the other hand, a gas phase portion is provided above the slurry inside the reactor, and the synthesis gas that has not reacted during passage through the slurry (namely, unreacted synthesis gas) and light hydrocarbons produced by the FT synthesis reaction that are gases under the conditions inside the reactor are transported from the slurry bed into this gas phase portion, subsequently pass through the gas phase portion, and are then discharged through a line connected to the top of the reactor. The discharged unreacted synthesis gas and light hydrocarbons are cooled, some of the light hydrocarbons condense to form liquid hydrocarbons (light liquid hydrocarbons), and these light liquid hydrocarbons are separated from the gas fraction (the unreacted synthesis gas and a hydrocarbon gas composed mainly of hydrocarbons of $C_4$ or less) by gas-liquid separation. The gas fraction is then recycled through the reactor to enable the unreacted synthesis gas to be reused, while the light liquid hydrocarbons are supplied to a liquid hydrocarbon refining process.

CITATION LIST

Patent Document

[Patent Document 1] Published Japanese Translation of PCT No. 2007-516065

SUMMARY OF INVENTION

Technical Problem

However, in the filter backwash treatment used in the technique disclosed in Patent Document 1, a portion of the liquid hydrocarbons (heavy liquid hydrocarbons) that have passed through the filter during filtering of the slurry is passed back through the filter in the opposite direction to the flow direction during filtering of the slurry, and is returned to the reactor to form part of the slurry again, and the process of discharging the slurry through the filter is then repeated. In other words, a portion of the heavy liquid hydrocarbons flows in and out of the reactor, passing repeatedly through the filter. Accordingly, during filtering of the slurry, the amount of heavy liquid hydrocarbons that passes through the filter per unit of time is significantly larger than the amount of heavy liquid hydrocarbons discharged from the FT synthesis reactor and supplied, per unit of time, to the subsequent liquid hydrocarbon refining steps.

In this type of operation, the filter is required to filter a large amount of slurry, meaning the load on the filter is great, and therefore the associated load on the backwash treatment is also large.

In this case, in order to cope with this required load on the filter, the filtration surface area of the filter must be increased, resulting in increased costs due to the increased size of the equipment, and associated increased maintenance costs.

The present invention has been developed in light of the above circumstances, and has an object of providing a method for producing hydrocarbons in which the amount of liquid hydrocarbons that passes repeatedly back and forth through the filter is reduced, thereby reducing the load on the filter.

Solution to Problem

A method for producing hydrocarbons according to the present invention includes a synthesis step of synthesizing hydrocarbons by the Fischer-Tropsch synthesis reaction using a slurry bubble column reactor having a slurry containing catalyst particles and liquid hydrocarbons retained inside the reactor, and having a gas phase portion located above the slurry, a discharging step of passing the slurry through a filter positioned inside and/or outside the reactor, thereby separating the catalyst particles and the heavy liquid hydrocarbons and discharging the heavy liquid hydrocarbons, a backwash step of flushing liquid hydrocarbons through the filter in the opposite direction to the flow direction of the above slurry, thereby returning the catalyst particles accumulated on the filter to the slurry bed inside the reactor, and a cooling and gas-liquid separation step of cooling the hydrocarbons discharged from the gas phase portion of the reactor that are gaseous under the conditions inside the reactor, and then separating the condensed light liquid hydrocarbons from the gas components and collecting the condensed light liquid hydrocarbons, wherein the liquid hydrocarbons that are flushed through the filter in the backwash step include the light liquid hydrocarbons obtained in the cooling and gas-liquid separation step.

Further, in the above method for producing hydrocarbons, the above-mentioned light liquid hydrocarbons may be light liquid hydrocarbons that are condensed in the cooling and gas-liquid separation step by cooling the hydrocarbons that are gaseous under the conditions inside the reactor to a temperature that is at least 180° C. but is lower than the temperature inside the reactor.

Further, the above method for producing hydrocarbons may further include a secondary cooling step of further cooling the light liquid hydrocarbons, and the light liquid hydrocarbons obtained from this step may be supplied to the backwash step.

Furthermore, in the above method for producing hydrocarbons, the liquid hydrocarbons that are flushed through the filter in the backwash step may be a mixture of the above-mentioned light liquid hydrocarbons and the heavy liquid hydrocarbons discharged in the discharging step.

Moreover, in the above method for producing hydrocarbons, the heavy liquid hydrocarbons within the above-mentioned mixture may be hydrocarbons from which at least a portion of the catalyst particles contained within the heavy liquid hydrocarbons discharged in the discharging step have been removed.

Advantageous Effects of Invention

According to the production method of the present invention, because light liquid hydrocarbons obtained by cooling and condensing the hydrocarbons discharged from the gas phase portion of the reactor, which are gaseous under the conditions inside the reactor, are used as the liquid hydrocarbons that are flushed through the filter in the backwash step, the amount of liquid hydrocarbons (heavy liquid hydrocarbons) that passes repeatedly back and forth through the filter during filtering of the slurry can be reduced. In other words, because the light hydrocarbons that are returned to the reactor in the backwash step are vaporized inside the reactor and subsequently discharged from the gas phase portion of the reactor, they do not form part of the slurry that passes through the filter. Accordingly, the amount of liquid hydrocarbons that passes through the filter per unit of time during filtering of the slurry is reduced, thereby reducing the load on the filter. As a result, the filtration surface area of the filter can be reduced, the production equipment can be reduced in size and simplified, and the amount of maintenance required for the equipment can be reduced.

DESCRIPTION OF EMBODIMENTS

The method for producing hydrocarbons according to the present invention is described below in further detail.

Figure 1:
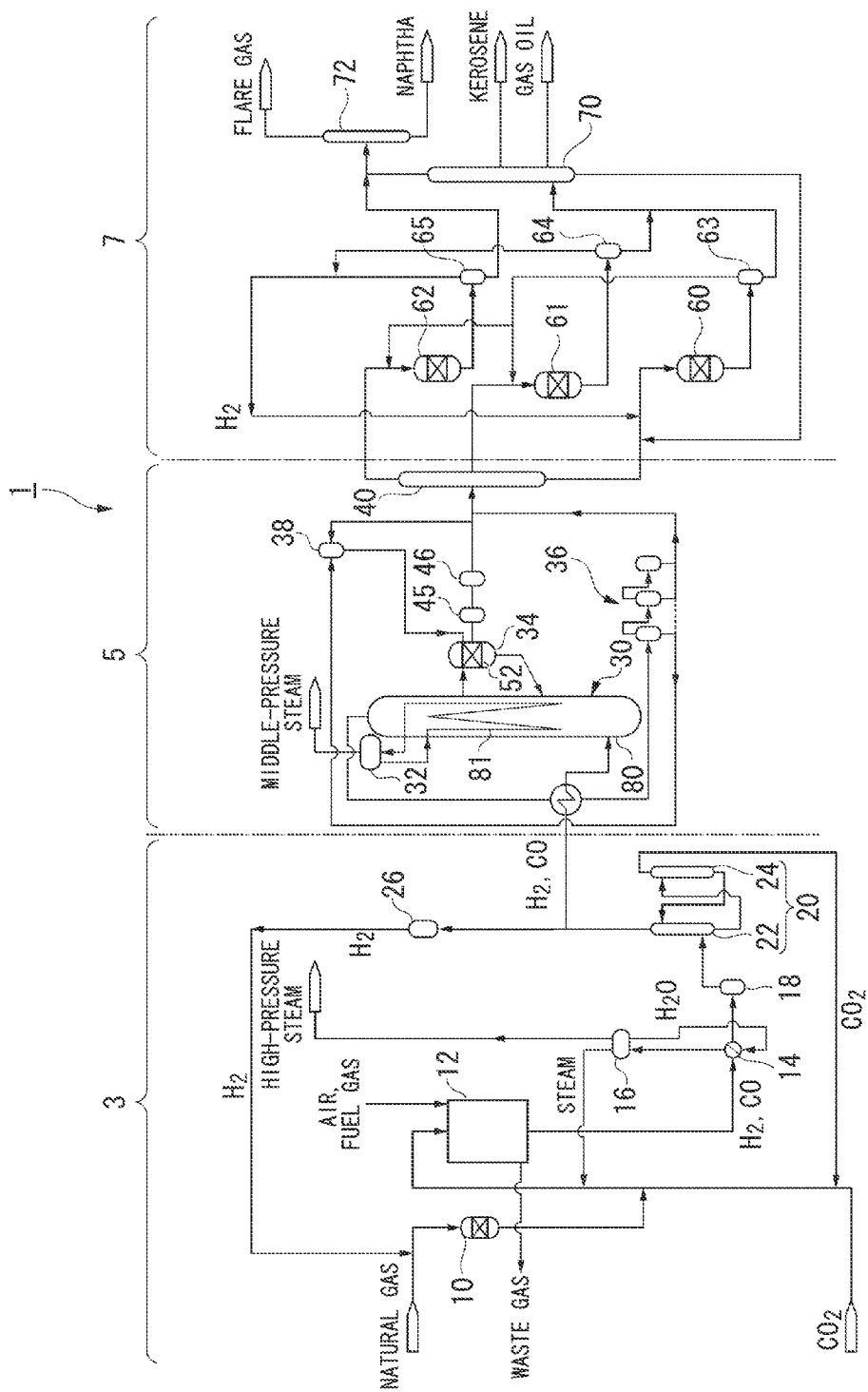
FIG. 1 is a schematic diagram illustrating the overall configuration of one example of a liquid fuel synthesis system according to the present invention.

First is a description, with reference to FIG. 1, of an example of a synthesis reaction system that is ideal for implementing the method for producing hydrocarbons according to the present invention.

A liquid fuel synthesis system 1 illustrated in FIG. 1 is a plant facility which carries out a GTL process that converts a hydrocarbon feedstock such as a natural gas into liquid fuels. This liquid fuel synthesis system 1 includes a synthesis gas production unit 3, an FT synthesis unit 5, and an upgrading unit 7. The synthesis gas production unit 3 reforms a natural gas that functions as a hydrocarbon feedstock to produce a synthesis gas containing carbon monoxide gas and hydrogen gas. The FT synthesis unit 5 synthesizes liquid hydrocarbons from the synthesis gas produced in the synthesis gas production unit 3 via the FT synthesis reaction. The upgrading unit 7 hydrogenates and refines the liquid hydrocarbons synthesized by the FT synthesis reaction to produce base stocks for liquid fuels (mainly kerosene and gas oil).

Structural elements of each of these units are described below.

The synthesis gas production unit 3 is composed mainly of a desulfurization reactor 10, a reformer 12, a waste heat boiler 14, gas-liquid separators 16 and 18, a $CO_2$ removal unit 20, and a hydrogen separator 26. The desulfurization reactor 10 is composed of a hydrodesulfurizer or the like, and removes sulfur compounds from the natural gas that functions as the feedstock. The reformer 12 reforms the natural gas supplied from the desulfurization reactor 10 to produce a synthesis gas containing carbon monoxide gas (CO) and hydrogen gas ($H_2$) as main components. The waste heat boiler 14 recovers waste heat from the synthesis gas produced in the reformer 12 to generate a high-pressure steam.

The gas-liquid separator 16 separates the water that has been heated by heat exchange with the synthesis gas in the waste heat boiler 14 into a gas (high-pressure steam) and a liquid. The gas-liquid separator 18 removes a condensed component from the synthesis gas that has been cooled in the waste heat boiler 14, and supplies a gas component to the $CO_2$ removal unit 20. The $CO_2$ removal unit 20 has an absorption tower 22 that uses an absorbent to remove carbon dioxide gas from the synthesis gas supplied from the gas-liquid separator 18, and a regeneration tower 24 that strips the carbon dioxide gas absorbed by the absorbent, thereby regenerating the absorbent. The hydrogen separator 26 separates a portion of the hydrogen gas contained within the synthesis gas from which the carbon dioxide gas has already been separated by the $CO_2$ removal unit 20. In some cases, the $CO_2$ removal unit 20 may not need to be provided.

The reformer 12 employs, for example, a steam and carbon dioxide gas reforming method represented by the chemical reaction formulas (1) and (2) shown below to reform the natural gas using carbon dioxide and steam, thereby producing a high-temperature synthesis gas that includes carbon monoxide gas and hydrogen gas as the main components. However, the reforming method employed in the reformer 12 is not limited to this steam and carbon dioxide gas reforming method, and for example, a steam reforming method, a partial oxidation reforming method (POX) using oxygen, an autothermal reforming method (ATR) that is a combination of a partial oxidation method and a steam reforming method, or a carbon dioxide gas reforming method may also be used.

$$CH_4+H_2O \rightarrow CO+3H_2 \qquad (1)$$

$$CH_4+CO_2 \rightarrow 2CO+2H_2 \qquad (2)$$

The hydrogen separator 26 is provided on a branch line that branches off a main line which connects the $CO_2$ removal unit 20 or gas-liquid separator 18 with a slurry bubble column reactor 30 (hereinafter also referred to as simply "the reactor 30"). This hydrogen separator 26 may be composed, for example, of a hydrogen PSA (Pressure Swing Adsorption) apparatus that performs adsorption and desorption of hydrogen by utilizing pressure difference. This hydrogen PSA apparatus has adsorbents (such as a zeolitic adsorbent, activated carbon, alumina or silica gel) packed inside a plurality of adsorption towers (not shown in the drawing) that are arranged in parallel. By sequentially repeating each of the steps of hydrogen pressurization, adsorption, desorption (depressurization) and purging within each of these adsorption towers, the hydrogen PSA apparatus can continuously supply a high-purity hydrogen gas (of approximately 99.9% purity) separated from the synthesis gas to the various hydrogen-utilizing reactors (for example, the desulfurization reactor 10, a wax fraction hydrocracking reactor 60, a middle distillate hydrotreating reactor 61, and a naphtha fraction hydrotreating reactor 62) that perform predetermined reactions by utilizing hydrogen.

The hydrogen gas separating method employed in the hydrogen separator 26 is not limited to the type of pressure swing adsorption method utilized by the above hydrogen PSA apparatus, and for example, a hydrogen storing alloy adsorption method, a membrane separation method, or a combination thereof may also be used.

Figure 2:
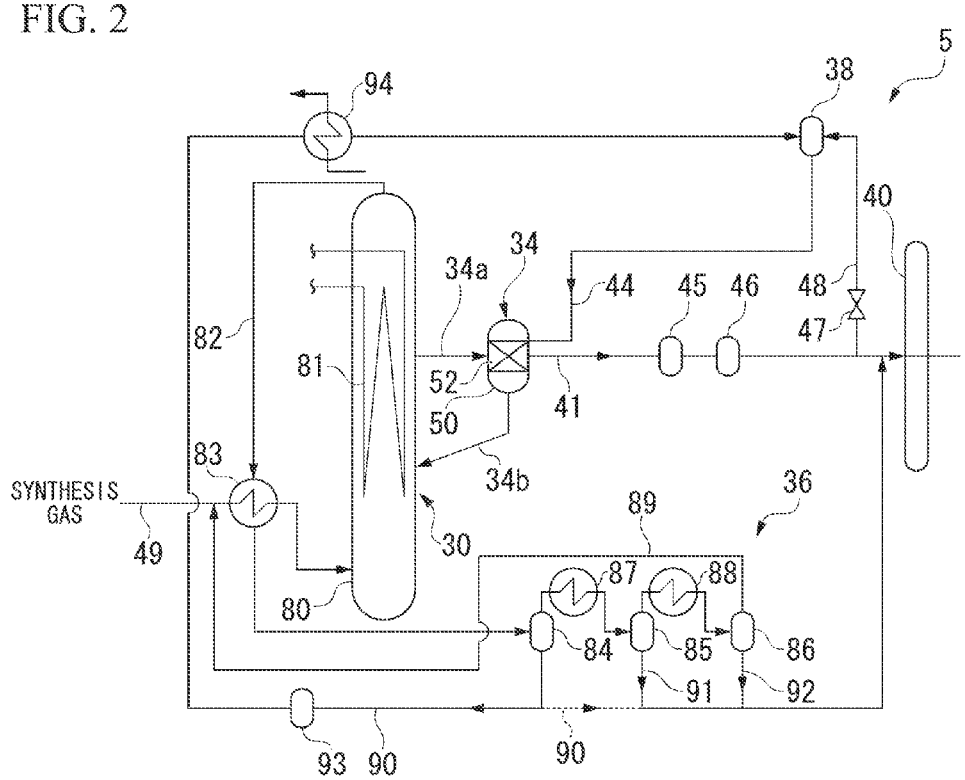
FIG. 2 is a schematic structural diagram illustrating an FT synthesis unit according to the present invention.

Next is a description of the FT synthesis unit 5, with reference to FIG. 1 and FIG. 2. As illustrated in FIG. 1 and FIG. 2, the FT synthesis unit 5 includes mainly the slurry bubble column reactor 30, a gas-liquid separator 32, an external catalyst separator 34, a gas-liquid separator 36, a backwash liquid vessel 38 and a first fractionator 40.

The slurry bubble column reactor 30 is a reactor that synthesizes liquid hydrocarbons from a synthesis gas, and functions as an FT synthesis reactor that synthesizes liquid hydrocarbons from the synthesis gas by the FT synthesis reaction. This reactor 30 is composed mainly of a reactor main unit 80 and a cooling line 81, and is operated with the inside of the reactor heated to approximately 190 to 270° C. and under pressurized conditions exceeding atmospheric pressure.

The reactor main unit 80 is a substantially circular cylindrical metal container. The inside of the reactor main unit 80 contains a slurry prepared by suspending solid catalyst particles within liquid hydrocarbons (the FT synthesis reaction product), and this slurry forms the slurry bed.

The synthesis gas containing hydrogen gas and carbon monoxide gas as the main components is injected into the slurry from a position in the bottom portion of the reactor main unit 80. This synthesis gas that has been injected into the slurry forms gas bubbles that ascend through the slurry along the height-wise direction (vertical direction) of the reactor main unit 80 from bottom to top. During this process, the synthesis gas dissolves in the liquid hydrocarbons and makes contact with the catalyst particles, causing the liquid hydrocarbon synthesis reaction (the FT synthesis reaction) to proceed. Specifically, the hydrogen gas and carbon monoxide gas react via the type of chemical reaction formula (3) shown below to produce hydrocarbons.

$$2nH_2+nCO \rightarrow (-CH_2-)_n+nH_2O \qquad (3)$$

Further, as the synthesis gas ascends through the inside of the reactor main unit 80 in the form of gas bubbles, an upward flow (air lift) is generated within the slurry inside the reactor main unit 80. As a result, a circulating flow is generated within the slurry inside the reactor main unit 80.

A gas phase portion is provided above the slurry contained inside the reactor main unit 80, and a gas-liquid separation occurs at the interface between this gas phase portion and the slurry. In other words, synthesis gas that passes through the interface between the slurry and the gas phase portion without having undergone reaction within the slurry, and comparatively light hydrocarbons produced by the FT synthesis reaction that exist in a gaseous state under the conditions inside the reactor main unit 80 move into the gas phase portion as gas components. Any liquid droplets lifted together with the gas components, and any catalyst particles contained within the liquid droplets are returned to the slurry under the force of gravity. The gas components (unreacted synthesis gas and light hydrocarbons) that ascend to the top of the reactor main unit 80 are discharged through a line connected to the top of the reactor main unit 80, and are then supplied to the cooled gas-liquid separator 36 in the manner described below.

The cooling line 81 is provided inside the reactor main unit 80, and maintains the temperature inside the system at a predetermined temperature by removing the heat of reaction generated by the FT synthesis reaction. This cooling line 81 may be formed, for example, by bending a single tube so that is runs up and down a plurality of times along the vertical direction. Further, a plurality of cooling lines having a so-called bayonet double-tube structure may also be installed inside the reactor main unit 80. In other words, the shape and number of cooling lines 81 is not limited to the shape and number described above, and any structure that can be positioned inside the reactor main unit 80 and contributes to cooling of the slurry may be used.

Cooling water (for example, water having a temperature that is approximately 0 to 50° C. lower than the temperature inside the reactor main unit 80) supplied from the gas-liquid separator 32 is passed through the cooling line 81, and cools the slurry inside the reactor main unit 80 during this passage through the inside of the cooling line 81 by heat exchange with the slurry via the walls of the cooling line 81. A portion of the cooling water is converted to steam, which is discharged to the gas-liquid separator 32 and can be recovered as middle-pressure steam.

The coolant used for cooling the slurry inside the reactor main unit 80 is not limited to the type of cooling water described above, and for example, $C_4$ to $C_{10}$ straight-chain, branched-chain or cyclic alkanes, olefins, low-molecular weight silanes, silyl ethers or silicone oils may also be used.

The gas-liquid separator 32 shown in FIG. 1 separates the water that has been heated by passage through the cooling line 81 provided inside the reactor main unit 80 into a steam (middle-pressure steam) and a liquid. This liquid separated within the gas-liquid separator 32 is re-supplied to the cooling line 81 as cooling water.

Although there are no particular limitations on the catalyst used in forming the slurry contained inside the reactor main unit 80, the use of a catalyst composed of solid particles prepared by supporting at least one active metal selected from among cobalt, ruthenium and iron and the like on a catalyst support formed from an inorganic oxide such as silica or alumina is preferred. In addition to the active metal, the catalyst may also include other metal components such as zirconium, titanium, hafnium or rhenium, which may be added for purposes such as enhancing the activity of the catalyst. Although there are no particular limitations on the shape of the catalyst particles, from the viewpoint of ensuring favorable slurry fluidity, and from the viewpoint of suppressing the generation of powdered catalyst particles formed by disintegration or abrasion of the catalyst particles caused by impact and friction between the moving catalyst particles, or between the moving catalyst particles and the inside walls of the reactor main unit 80 or the cooling line 81, substantially spherical particles are preferred.

Further, although there are no particular limitations on the average particle size of the catalyst particles, from the viewpoint of ensuring favorable slurry fluidity, a particle size of approximately 40 to 150 μm is preferred.

As illustrated in FIG. 2, the external catalyst separator 34 includes a separation vessel 50 disposed outside the reactor 30, and a filter 52 provided inside the separation vessel 50. An outflow line 34a that is connected to the middle portion of the reactor main unit 80 is provided within the upper portion of the separation vessel 50, whereas a return line 34b that is connected to the bottom portion of the reactor main unit 80 is provided within the lower portion of the separation vessel 50. Here, the expression "bottom portion of the reactor main unit 80" refers to the portion from the bottom of the reactor main unit 80 up to not more than ⅓ of the height of the reactor main unit 80, whereas the expression "middle portion of the reactor main unit 80" refers to the portion between the top portion and the bottom portion of the reactor main unit 80. Furthermore, a first line 41 and a second line 44 are also connected to the separation vessel 50, and this first line 41 and second line 44 are connected to the filter 52 inside the separation vessel 50.

Figure 3A:
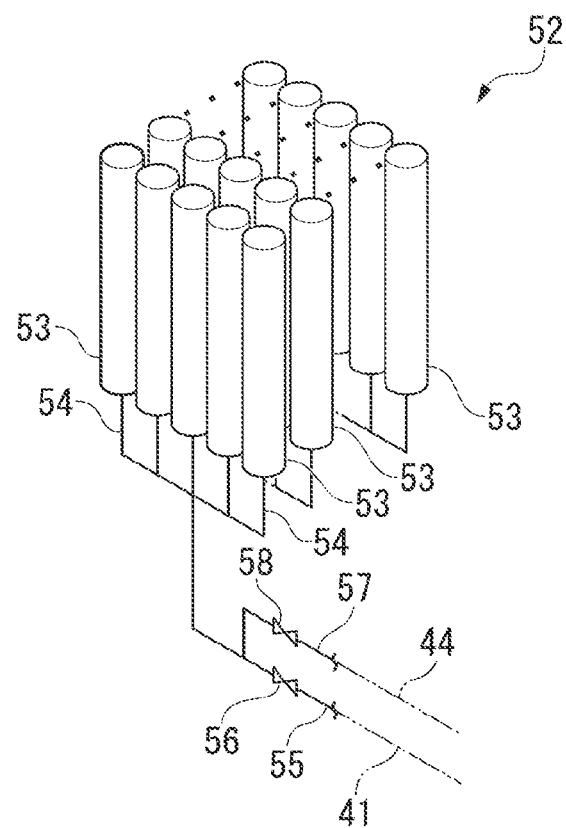
FIG. 3A is a schematic structural diagram illustrating a filter according to the present invention.

As illustrated in FIG. 3A, the filter 52 has a structure in which a plurality of filter elements 53 are arranged in a grid-like manner in the horizontal direction. Further, if necessary, a plurality of stages of these groupings of filter elements 53 arranged in a grid-like manner may be provided at different locations along the slurry flow direction, for example at a plurality of locations in the vertical direction, thus forming a multi-stage structure.

A first line 54 for discharging the filtrate (liquid hydrocarbons) from each system is connected to each of these filter elements 53, and these first lines 54 are all connected to a single second line 55. If necessary, each first line 54 may be provided with an individual closeable valve (not shown in the drawing). Further, a valve 56 is provided within the second line 55, and a valve 58 is provided within a third line 57. The second line 55 is connected to the first line 41 illustrated in FIG. 2, and the third line 57 is connected to the second line 44 illustrated in FIG. 2.

Figure 3B:
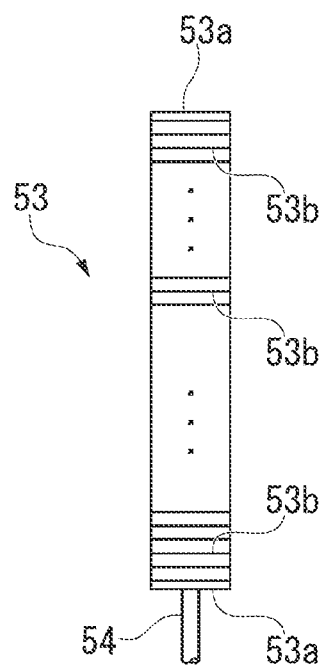
FIG. 3B is a schematic structural diagram illustrating a filter element according to the present invention.

As illustrated in FIG. 3B, each filter element 53 is a column-shaped element (with a circular cylindrical or rectangular column shape), inside which a plurality of filtration media 53b are stacked between a pair of plates 53a. The above-mentioned first line 54 is connected to the lower plate 53a. By employing this type of structure, the filter element 53 is able to use the filtration media 53b to filter the slurry that has been discharged from the reactor 30 through the outflow line 34a, thereby trapping the catalyst particles contained within the slurry. Meanwhile, the liquid hydrocarbons within the slurry are discharged through the first line 54 as a filtrate. The pores size of the filtration media 53b of the filter element 53 is typically within a range from 5 to 30 μm, preferably from 5 to 25 μm, and more preferably from 5 to 20 μm.

As illustrated in FIG. 2, the return line 34b is used for returning, to the reactor main unit 80, the concentrated slurry generated by the filtration, and the catalyst particles and liquid hydrocarbons (hydrocarbon oil) removed from the filter 52 (filtration media 53b) during the backwash treatment of the filter 52 performed in the external catalyst separator 34.

A filtration unit 45 and a storage vessel 46 are provided, in that order, within the first line 41. The filtration unit 45 has an internal filter (not shown in the drawing) which is used to filter the heavy liquid hydrocarbons introduced into the unit. In other words, the filter inside the filtration unit 45 traps and removes at least a portion of the catalyst particles of comparatively small particle size contained within the heavy liquid hydrocarbons that were not trapped by the filter 52 (filtration media 53b) inside the external catalyst separator 34. The pore size of the filter within the filtration unit 45 is typically approximately 5 μm. Further, the storage vessel 46 temporarily stores the heavy liquid hydrocarbons that have passed through the filter 52 inside the external catalyst separator 34 and the filtration unit 45.

The first fractionator 40 is connected to the downstream side of the filtration unit 45 by the first line 41. Further, a third line 48 having a valve 47 provided partway along the line branches off the first line 41 at a location on the downstream side of the filtration unit 45, and this third line 48 is connected to the backwash liquid vessel 38.

The backwash liquid vessel 38 is used for storing the light liquid hydrocarbons described below, but by adopting the configuration described above, heavy liquid hydrocarbons that have been filtered by the external catalyst separator 34 and the filtration unit 45 may be supplied to the backwash liquid vessel 38 and mixed with the light liquid hydrocarbons as required. The above-mentioned second line 44 is connected to the backwash liquid vessel 38, and this enables the backwash liquid vessel 38 to discharge the stored light liquid hydrocarbons, or the mixture of the light liquid hydrocarbons and the heavy liquid hydrocarbons (a mixed oil), through the second line 44 and into the external catalyst separator 34 as a backwash liquid.

A discharge line 82 is connected to the gas phase portion (top portion) of the reactor main unit 80 of the reactor 30. The discharge line 82 is connected to the gas-liquid separator 36 via a heat exchanger 83, and transports the gas components that ascend to the top of the inside of the reactor main unit 80, namely the unreacted synthesis gas and those light hydrocarbons that are products of the FT synthesis reaction and exist as gases under the conditions inside the reactor main unit 80, to the gas-liquid separator 36. The heat exchanger 83 performs a heat exchange between the synthesis gas supplied from the synthesis gas production unit 3 and the gas components discharged from the reactor main unit 80, thereby heating the relatively lower temperature synthesis gas and cooling the relatively higher temperature gas components, and condensing those components among the gas components that have a comparatively high boiling point to form a portion of the light liquid hydrocarbons.

The gas-liquid separator 36 includes a first drum 84, a second drum 85, a third drum 86, a first condenser 87, and a second condenser 88. The first drum 84 is connected directly to the discharge line 82, and performs a gas-liquid separation of the gas-liquid mixture obtained when the above gas components undergo cooling in the heat exchanger 83, thereby condensing a portion of the gas components. The heat exchanger 83 cools the gas components discharged from the reactor main unit 80 by heat exchange with the synthesis gas supplied to the reactor 30, thus liquefying a portion of the gas components. The temperature to which the gas components discharged from the reactor main unit 80 are cooled by the heat exchanger 83 (namely, the outlet temperature for the heat exchanger 83) is preferably not less than 180° C., more preferably not less than 200° C., and most preferably 210° C. or higher. This temperature must necessarily be a lower temperature than the temperature of the gas components discharged from the reactor main unit 80, namely, a lower temperature than the temperature inside the reactor main unit 80. The temperature inside the reactor main unit 80 varies depending on the selected reaction conditions and therefore cannot be readily specified, but is typically within a range from 190 to 270° C., and preferably from 200 to 260° C. By cooling the above gas components to a temperature within the range mentioned above, only those compounds within the gas components that have a comparatively high boiling point can be selectively liquefied, and as a result, the obtained liquid hydrocarbons are able to function favorably as a backwash liquid, as described below. Namely, any vaporization of the backwash liquid, caused by an increase in temperature of the backwash liquid due to the surrounding temperature, prior to the backwash liquid passing through the filter 52 can be suppressed, enabling a more efficient backwash operation to be performed.

By using, as the backwash liquid for the filter 52, those light liquid hydrocarbons obtained within the heat exchanger 83 by cooling and condensing the gas components discharged from the gas phase portion of the reactor main unit 80 to a temperature that is preferably not less than 180° C., more preferably not less than 200° C., and most preferably 210° C. or higher, but lower than the temperature inside the reactor main unit 80, deterioration over time in the activity of the catalyst used for the FT synthesis reaction can be suppressed.

In other words, in the FT synthesis reaction, in addition to the hydrocarbons that represent the main products, oxygen-containing compounds such as alcohols containing an oxygen atom derived from the carbon monoxide are also produced as by-products. These oxygen-containing compounds can cause a deterioration in the activity of the catalyst used for the FT synthesis reaction. On the other hand, because of the nature of the FT synthesis reaction, these oxygen-containing compounds tend to be incorporated mostly in the fraction containing the fewest number of carbon atoms (namely, the fraction having the lowest boiling point). As a result, using a liquid hydrocarbon oil containing a large proportion of the low boiling point fraction (light fraction) as the backwash liquid for the filter 52 increases the concentration of oxygen-containing compounds within the backwash liquid, meaning the flow of the backwash liquid into the reactor main unit 80 tends to increase the concentration of oxygen-containing compounds within the liquid hydrocarbons inside the reactor main unit 80. This increases the likelihood of the catalyst for the FT synthesis reaction deteriorating over time.

In contrast, by using, as the backwash liquid, the light liquid hydrocarbons obtained in the heat exchanger 83 by cooling and condensing the gas components discharged from the gas phase portion of the reactor main unit 80 at a temperature within the above range, the fraction among the light liquid hydrocarbons that has a comparatively low concentration of oxygen-containing compounds is used as the backwash liquid, meaning the effect of the backwash liquid on any deterioration in the catalyst used for the FT synthesis reaction can be reduced.

The present embodiment describes an example in which the above-mentioned gas components are cooled by the heat exchanger 83 using the relative coldness of the synthesis gas, but in an alternative configuration, the system may be provided with one or a plurality of separate cooling units (not shown in the drawings) which cool the gas components discharged from the reactor main unit 80 to a temperature within the above-mentioned range.

In this manner, the liquid hydrocarbons (light liquid hydrocarbons) obtained from the gas-liquid separation performed in the first drum 84 can be used favorably as the backwash liquid, as described below, whereas the gas components separated from these liquid hydrocarbons are discharged toward the second drum 85.

The first condenser 87 is provided within a line that links the first drum 84 and the second drum 85, and liquefies a portion of the gas components discharged from the first drum 84 by heat exchange with a cooling medium such as water. In the first condenser 87, by setting the outlet temperature, for example, to a temperature of 100° C., those hydrocarbons having a boiling point exceeding approximately 100° C. within the gas components supplied from the first drum 84 are liquefied. The second drum 85 then separates the liquid hydrocarbons (light liquid hydrocarbons) having a boiling point exceeding approximately 100° C. and the gas components having a boiling point of approximately 100° C. or lower, and discharges the gas components toward the third drum 86.

The second condenser 88 is provided within a line that links the second drum 85 and the third drum 86, and liquefies a portion of the gas components discharged from the second drum 85 by heat exchange with a cooling medium such as water. In the second condenser 88, by setting the outlet temperature, for example, to a temperature of 40° C., those hydrocarbons having a boiling point exceeding approximately 40° C. within the gas components supplied from the second drum 85 are liquefied. The third drum 86 then separates the liquid hydrocarbons (light liquid hydrocarbons) having a boiling point exceeding approximately 40° C. and the gas components having a boiling point of approximately 40° C. or lower, and discharges the gas components through a return line 89. The gas components are transported through the return line 89 and returned to a synthesis gas supply line 49.

These gas components include mainly unreacted synthesis gas ($CO$, $H_2$) and hydrocarbons of $C_4$ or less, and are mixed with the synthesis gas supplied from the synthesis gas production unit 3 inside the synthesis gas supply line 49, before being recycled back into the reactor 30 so that the unreacted synthesis gas can be reused. At least a portion of the gas components discharged from the third drum 86 may be incinerated as a flare gas or used as a fuel, rather than being returned to the synthesis gas supply line 49.

A first line 90 is connected to the bottom of the first drum 84. As illustrated by the solid line in FIG. 2, the first line 90 is connected to the backwash liquid vessel 38, and supplies light liquid hydrocarbons from the first drum 84 to the backwash liquid vessel 38. If required, this first line 90 may be provided with a vessel 93 fitted with a filter. This filter inside the vessel 93 traps and removes any small amount of catalyst particles that may be contained within the liquid hydrocarbons discharged form the first drum 84. In other words, the gas components discharged from the gas phase portion inside the reactor main unit 80 include a slurry mist, and this mist may include catalyst particles. In such cases, these catalyst particles mainly settle out inside the first drum 84, and are discharged into the first line 90 together with the liquid hydrocarbons. Accordingly, by filtering the discharged liquid hydrocarbons through the filter inside the vessel 93, the problems that arise when a small amount of catalyst particles is supplied to the filter from the opposite direction during the backwash treatment described below can be avoided.

Further, a secondary cooling unit 94 is provided within the first line 90 in a location downstream from the vessel 93 (namely, closer to the backwash liquid vessel 38). The secondary cooling unit 94 performs a heat exchange between the light liquid hydrocarbons flowing through the first line 90 and a cooling medium such as water, thereby further cooling the light liquid hydrocarbons flowing through the first line 90.

In other words, the light liquid hydrocarbons obtained by subjecting the gas components discharged from the gas phase portion inside the reactor main unit 80 to heat exchange with the synthesis gas in the heat exchanger 83 are cooled further by the secondary cooling unit 94. There are no particular limitations on the outlet temperature of the secondary cooling unit 94, provided the temperature is lower than the outlet temperature of the heat exchanger 83, but a temperature of not less than 100° C. and not more than 200° C. is preferred, and a temperature of not less than 120° C. and not more than 190° C. is particularly desirable.

In those cases where the outlet temperature of the secondary cooling unit 94 is lower than 100° C., there is a concern that a wax fraction may precipitate and adhere to the tube inside the secondary cooling unit 94, resulting in a deterioration in the cooling efficiency due to inferior heat transfer. Further, there is also a concern that when the light liquid hydrocarbons that have undergone secondary cooling within the secondary cooling unit 94 pass through the backwash liquid vessel 38 and the second line 44, and are used as a backwash liquid that is passed through the filter 52 inside the external catalyst separator 34 in the opposite direction to the flow direction during filtration, the relative coldness of the light liquid hydrocarbons may cause cooling of heavy liquid hydrocarbons that exist in the vicinity of the filter 52, resulting a portion of these heavy liquid hydrocarbons precipitating as a wax, which can then lead to problems such as an increase in the differential pressure of the filter 52. In contrast, if the outlet temperature of the secondary cooling unit 94 exceeds 200° C., then when the light liquid hydrocarbons are supplied to the filter 52 inside the external catalyst separator 34, there is a possibility that the time taken for the light liquid hydrocarbons to vaporize may not be able to be delayed satisfactorily, and the light liquid hydrocarbons may vaporize while passing through the filter 52, making it more difficult to efficiently remove the catalyst particles accumulated on the filter 52.

In this manner, the purpose of subjecting the light liquid hydrocarbons discharged from the first drum 84 to secondary cooling is to avoid the problem that can occur upon supply of these light liquid hydrocarbons as a backwash liquid to the external catalyst separator 34, the internal temperature of which is similar to the temperature inside the reactor main unit 80 (for example, 190 to 270° C.), wherein the temperature inside the external catalyst separator 34 (for example, 190 to 270° C.) causes the temperature of the light liquid hydrocarbons to increase to the boiling point of the hydrocarbons in a very short time, meaning the light liquid hydrocarbons are vaporized and are unable to function satisfactorily as the backwash liquid. In other words, by cooling the light liquid hydrocarbons to a temperature considerably lower than the boiling point of the hydrocarbons, the time taken for the light liquid hydrocarbons to vaporize upon introduction into the external catalyst separator 34 as a backwash liquid can be delayed. Accordingly, the backwash treatment can be completed while the light liquid hydrocarbons are still in a liquid state, enabling the catalyst particles accumulated on the filter 52 to be removed efficiently.

The light liquid hydrocarbons that have been discharged from the first drum 84, transported through the first line 90 and subjected to secondary cooling in the secondary cooling unit 94 in the manner described above flow into the backwash liquid vessel 38, and are stored temporarily in this vessel as the backwash liquid. Further, the light liquid hydrocarbons may also be mixed, inside the backwash liquid vessel 38, with the liquid hydrocarbons supplied through the third line 48, thus forming a mixture (mixed oil) for use in the backwash treatment (further details are provided below).

A second line 91 is connected to the bottom of the second drum 85, and a third line 92 is connected to the bottom of the third drum 86. These lines join to form a single line, which is connected to the first line 41 at a position downstream from the branch point for the third line 48.

The first fractionator 40 is connected to the first line 41, and fractionally distills the heavy liquid hydrocarbons supplied through the first line 41, namely the liquid hydrocarbons supplied from the external catalyst separator 34, and the light liquid hydrocarbons supplied through the second and third lines 91 and 92, namely the light liquid hydrocarbons supplied from the second drum 85 and the third drum 86, thereby separating the hydrocarbons into a series of fractions according to their respective boiling points.

In the above description, the gas-liquid separator 36 is composed of the first drum 84, the second drum 85, the third drum 86, the first condenser 87 and the second condenser 88, and by adopting this type of configuration, the light liquid hydrocarbons can be collected with good reliability.

However, the gas-liquid separator 36 is not limited to the configuration described above, and for example, a configuration may be adopted in which the second drum 85, the second condenser 88 and the second line 91 are not provided, and the outlet line from the first condenser 87 is connected to the inlet line of the third drum 86. In such a case, the outlet temperature of the first condenser 87 is typically set to approximately 40° C.

Further, the example above describes the case in which only the light liquid hydrocarbons separated in the first drum 84 are transported through the first line 90 to the backwash liquid vessel 38 for use as the backwash liquid, but the light liquid hydrocarbons for use as the backwash liquid are not limited to these hydrocarbons alone, and a mixture of the light liquid hydrocarbons separated in the second drum 85 and/or the light liquid hydrocarbons separated in the third drum 86 together with the light liquid hydrocarbons separated in the first drum 84 may also be used. In other words, the light liquid hydrocarbons discharged from the second drum 85 through the second line 91 and/or the light liquid hydrocarbons discharged from the third drum 86 through the third line 92 may be merged with the hydrocarbons in the first line 90 using a portion of the line 90 represented by the dashed line in the drawing, thereby forming a mixture with the light liquid hydrocarbons discharged from the first drum 84, and this mixture may then be transported to the backwash liquid vessel 38 and used as a backwash liquid.

The upgrading unit 7 illustrated in FIG. 1 includes, for example, a wax fraction hydrocracking reactor 60, a middle distillate hydrotreating reactor 61, a naphtha fraction hydrotreating reactor 62, gas-liquid separators 63, 64 and 65, a second fractionator 70, and a naphtha stabilizer 72. The wax fraction hydrocracking reactor 60 is connected to the bottom of the first fractionator 40. The middle distillate hydrotreating reactor 61 is connected to a middle portion of the first fractionator 40. The naphtha fraction hydrotreating reactor 62 is connected to the top portion of the first fractionator 40. The gas-liquid separators 63, 64 and 65 are provided so as to correspond to the hydrogenation reactors 60, 61 and 62 respectively. The second fractionator 70 fractionally distills the liquid hydrocarbons supplied from the gas-liquid separators 63 and 64 in accordance with their respective boiling points. The naphtha stabilizer 72 rectifies the liquid hydrocarbons of the naphtha fraction supplied from the gas-liquid separator 65 and the top of the second fractionator 70, and the resulting gas components of $C_4$ or less are discharged as a flare gas, while the components having a carbon number of 5 or greater are collected as a naphtha product.

Next is a description of the steps for synthesizing liquid fuels from a natural gas (GTL process) using the synthesis reaction system 1 having the configuration described above.

A natural gas (the main component of which is $CH_4$) is supplied as a hydrocarbon feedstock to the synthesis reaction system 1 from an external natural gas supply source (not shown in the drawing) such as a natural gas field or a natural gas plant. The above synthesis gas production unit 3 reforms the natural gas to produce a synthesis gas (a mixed gas containing carbon monoxide gas and hydrogen gas as the main components).

First, the natural gas described above is supplied to the desulfurization reactor 10 together with the hydrogen gas separated by the hydrogen separator 26. In the desulfurization reactor 10, sulfur compounds included in the natural gas are hydrogenated by the hydrogen gas and converted to hydrogen sulfide using a conventional hydrodesulfurization catalyst, and the thus obtained hydrogen sulfide is adsorbed and removed using an adsorbent such as zinc oxide, thus achieving desulfurization of the natural gas. By subjecting the natural gas to a preliminary hydrodesulfurization in this manner, any reduction in the activity of the catalysts used in the reformer 12, the slurry bubble column reactor 30 and the hydrotreating reactors of the upgrading unit 7 caused by sulfur compounds can be prevented.

The natural gas (which may also include carbon dioxide gas) that has been desulfurized in this manner is supplied to the reformer 12 after mixing with carbon dioxide gas ($CO_2$) supplied from a carbon dioxide gas supply source (not shown in the drawing) and the steam generated in the waste heat boiler 14. In the reformer 12, the natural gas is reformed, for example, using the carbon dioxide gas and the steam via a steam-carbon dioxide reforming process, thereby producing a high-temperature synthesis gas containing carbon monoxide gas and hydrogen gas as main components. At this time, a fuel gas and air for a burner installed in the reformer 12 are supplied to the reformer 12, and the combustion heat from the fuel gas in the burner and the radiant heat from the furnace of the reformer 12 are used to provide the necessary heat of reaction for the above steam-carbon dioxide gas reforming reaction, which is an endothermic reaction.

The high-temperature synthesis gas (for example, 900° C., 2.0 MPaG) produced in the reformer 12 in this manner is supplied to the waste heat boiler 14, and is cooled (for example, to 400° C.) by heat exchange with the water flowing through the waste heat boiler 14, thereby recovering the waste heat from the synthesis gas. At this time, the water heated by the synthesis gas in the waste heat boiler 14 is supplied to the gas-liquid separator 16, and from the gas-liquid separator 16, the gas component is supplied as high-pressure steam (for example, 3.4 to 10.0 MPaG) to the reformer 12 or other external apparatus, while the liquid water is returned to the waste heat boiler 14.

Meanwhile, the synthesis gas that has been cooled within the waste heat boiler 14 is subjected to separation and removal of a condensed liquid fraction in the gas-liquid separator 18, and is then supplied to either the absorption tower 22 of the $CO_2$ removal unit 20 or the slurry bubble column reactor 30. In the absorption tower 22, carbon dioxide gas contained in the synthesis gas is absorbed by an absorbent housed within the absorption tower 22, thereby separating and removing the carbon dioxide gas from the synthesis gas. The absorbent that has absorbed the carbon dioxide gas within the absorption tower 22 is introduced into the regeneration tower 24, and this absorbent containing the absorbed carbon dioxide gas is then heated, for example with steam, and subjected to a stripping treatment to strip the carbon dioxide gas, which is subsequently fed from the regeneration tower 24 to the reformer 12 and reused for the above reforming reaction.

The synthesis gas produced in the synthesis gas production unit 3 in this manner is supplied to the slurry bubble column reactor 30 of the aforementioned FT synthesis unit 5 via the supply line 49 shown in FIG. 2. At this time, the composition ratio of the synthesis gas supplied to the slurry bubble column reactor 30 is adjusted to a composition ratio suitable for the FT synthesis reaction (for example, $H_2:CO=2:1$ (molar ratio)). In the present embodiment, this synthesis gas is used as a coolant for cooling the gas components discharged from the gas phase portion of the slurry bubble column reactor 30 in the heat exchanger 83. In order to achieve cooling of the gas components to a predetermined temperature, the gas components may also be subjected to preliminary cooling as required. In addition, the synthesis gas may also be pressurized to a pressure suitable for the FT synthesis reaction (for example, 3.6 MPaG) by a compressor (not shown in the drawing) provided in the line that connects the $CO_2$ removal unit 20 with the slurry bubble column reactor 30.

Furthermore, a portion of the synthesis gas that has undergone separation of the carbon dioxide gas by the above $CO_2$ removal unit 20 is also supplied to the hydrogen separator 26. In the hydrogen separator 26, the hydrogen gas contained in the synthesis gas is separated by adsorption and desorption utilizing a pressure difference (hydrogen PSA) as described above. The separated hydrogen gas is supplied continuously from a gas holder or the like (not shown in the drawing), via a compressor (not shown in the drawing), to the various hydrogen-utilizing reactors (for example, the desulfurization reactor 10, the wax fraction hydrocracking reactor 60, the middle distillate hydrotreating reactor 61, and the naphtha fraction hydrotreating reactor 62) within the synthesis reaction system 1 that perform predetermined reactions by utilizing hydrogen.

Next, the FT synthesis unit 5 synthesizes liquid hydrocarbons by the FT synthesis reaction from the synthesis gas produced in the above synthesis gas production unit 3. A first embodiment of the method for producing hydrocarbons according to the present invention is described below on the basis of a method for synthesizing hydrocarbons by the FT synthesis reaction.

The synthesis gas produced in the synthesis gas production unit 3 described above is heated by heat exchange in the heat exchanger 83 with the gas components discharged from the gas phase portion of the reactor main unit 80 of the reactor 30, and is then introduced into the bottom of the reactor main unit 80 that constitutes the slurry bubble column reactor 30, and ascends up through the slurry contained within the reactor main unit 80. During this time within the reactor main unit 80, the carbon monoxide and hydrogen gas contained within the synthesis gas react with each other by the above-mentioned FT synthesis reaction, thus producing hydrocarbons.

Moreover, during this synthesis reaction, the reaction heat of the FT synthesis reaction is removed by flowing water through the cooling line 81. The water that has been heated by this heat exchange is vaporized into steam. This liquid water contained within this steam is separated in the gas-liquid separator 32, and the liquefied water is returned to the cooling line 81, while the gas fraction is supplied to an external apparatus as a middle-pressure steam (for example, 1.0 to 2.5 MPaG).

As illustrated in FIG. 2, a portion of the slurry containing the liquid hydrocarbons and catalyst particles from within the reactor main unit 80 of the slurry bubble column reactor 30 is discharged from the middle portion of the reactor main unit 80 via the outflow line 34*a*, and introduced into the external catalyst separator 34.

In the external catalyst separator 34, the introduced slurry is filtered through the filter 52 to trap the catalyst particles. This filtering separates the slurry into a solid fraction and a liquid fraction containing the liquid hydrocarbons. Liquid hydrocarbons are discharged from the reactor 30 by the filtration treatment using the external catalyst separator 34 (discharging step). The external catalyst separator 34 is operated so that the temperature and pressure inside the external catalyst separator 34 are basically the same as those inside the reactor main unit 80. Accordingly, the liquid fraction obtained upon filtration through the filter 52 is composed of hydrocarbons that are liquid under the conditions inside the reactor main unit 80, namely heavy liquid hydrocarbons.

In the present embodiment, the external catalyst separator 34 is configured to perform a normal filtration step using a portion of the filter elements 53 of the filter 52 illustrated in FIG. 3A by controlling the valve 56 provided within the second line 55 connected to those filter elements 53. Further, the remaining filter elements 53 perform the backwash treatment step described below by controlling the valve 56 provided within the second line 55 connected to those filter elements 53 and the valve 58 provided within the third line 57. In other words, in the present embodiment, a portion of the filter elements 53 that constitute the filter 52 illustrated in FIG. 3A perform the normal filtration treatment, while the remaining filter elements 53 perform the backwash treatment. Switching between this normal filtration treatment and the backwash treatment can be controlled by operating the valve 56 and the valve 58. The filtration treatment and the backwash treatment are alternated after a predetermined period of time. In other words, a control unit (not shown in the drawing) is operated so as to automatically switch each of the valves 56 and the valves 58 after the predetermined period of time has elapsed.

Accordingly, the catalyst particles trapped in the filtration step are removed from the surface of the filter 52 in the subsequently performed backwash step, and are returned to the slurry bed inside the reactor main unit 80, together with the backwash liquid, through the return line 34*b*.

The heavy liquid hydrocarbons (liquid fraction), from which the catalyst particles have been separated by the filter 52 in the filtration treatment performed in the external catalyst separator 34, and which have subsequently been transported through the first line 54 and the second line 55 into the first line 41, may be subjected to a second filtration treatment in the filtration unit 45, as illustrated in FIG. 2. In the filtration unit 45, an internal filter is used to filter the heavy liquid hydrocarbons to trap and remove at least a portion of the powdered catalyst particles contained within the heavy liquid hydrocarbons, which are generated due to friction and disintegration of the catalyst particles inside the reactor main unit 80 and are not trapped by the filter 52 (filtration media 53*b*) of the external catalyst separator 34.

The heavy liquid hydrocarbons that have undergone a second filtration treatment in the filtration unit 45 are stored temporarily in the storage vessel 46.

Then, the heavy liquid hydrocarbons are discharged from the storage vessel 46, merged with the light liquid hydrocarbons discharged from the second drum 85 and the third drum 86, and supplied to the first fractionator 40. Further, in some cases, a portion of the heavy liquid hydrocarbons may be supplied to the backwash liquid vessel 38 as a backwash liquid by operating the valve 47, with the remainder being supplied to the first fractionator 40. In the following description of the present embodiment, it is assumed that the total amount of the heavy liquid hydrocarbons is supplied to the first fractionator 40, with none of the heavy liquid hydrocarbons being supplied to the backwash liquid vessel 38 as a backwash liquid.

As described above, the gas components discharged from the gas phase portion of the reactor main unit 80 pass through the discharge line 82 and undergo heat exchange in the heat exchanger 83, thereby cooling and liquefying a portion of the gas components using the synthesis gas, and the resulting gas-liquid mixture is fed into the first drum 84 of the gas-liquid separator 36. Inside the first drum 84, the gas-liquid mixture undergoes gas-liquid separation, and the resulting liquid fraction, namely the light liquid hydrocarbons, is discharged into the first line 90.

As mentioned above, the light liquid hydrocarbons discharged through the first line 90 are fed into the vessel 93, and the filter inside the vessel 93 is used to trap and remove any small amount of catalyst particles that may be contained within the light liquid hydrocarbons. The light liquid hydrocarbons discharged from the vessel 93 are then subjected to secondary cooling to a predetermined temperature inside the secondary cooling unit 94 (secondary cooling step). Subsequently, the secondary cooled light liquid hydrocarbons are fed into the backwash liquid vessel 38, and are stored as a liquid for use in the backwash treatment, namely as the backwash liquid.

If the light liquid hydrocarbons obtained in this manner are used as the backwash liquid, then once the backwash liquid was been returned to the inside of the reactor main unit 80, the light liquid hydrocarbons vaporize and are discharged from the reactor main unit 80 as a part of the gas components, meaning they do not undergo filtration treatment through the filter 52 of the external catalyst separator 34 as part of the slurry. Accordingly, the backwash liquid composed of these light liquid hydrocarbons does not pass repeatedly back and forth through the filter 52, and therefore the load on the filter 52 can be reduced significantly compared with the conventional case where heavy liquid hydrocarbons are used as the backwash liquid.

The gas components separated from the liquid components in the first drum 84 are discharged from the first drum 84 and cooled in the first condenser 87 to liquefy a portion of the hydrocarbons, and the liquefied components (light liquid hydrocarbons) are separated from the gas components in the second drum 85 and supplied to the first fractionator 40. Further, the gas components separated from the liquid components in the second drum 85 are discharged from the second drum 85 and cooled in the second condenser 88 to liquefy a portion of the hydrocarbons, and the liquefied components (light liquid hydrocarbons) are separated from the gas components in the third drum 86 and supplied to the first fractionator 40.

The liquid components that flow into the first drum 84 and/or the second drum 85 include water, which is produced as a by-product inside the reactor 30. Accordingly, the bottom of the first drum 84 and/or the bottom of the second drum 85 is preferably provided with a water discharging line (not shown in the drawing).

Further, the backwash treatment (backwash step), which is performed in the external catalyst separator 34 in parallel with the filtration treatment, is performed by flowing the backwash liquid (light liquid hydrocarbons), which has been fed into the second line 44 from the backwash liquid vessel 38, through the filter elements 53 via the third line 57 illustrated in FIG. 3A. In other words, the backwash liquid inside the backwash liquid vessel 38 is pumped into the second line 44 (using a pump not shown in the drawings), and passes through the third line 57 and the first line 54 into the filter elements 53. Accordingly, the backwash liquid is fed into the external catalyst separator 34, passes through the third line 57, flows back through the first line 54, and washes (backwashes) the filtration media 53b of the filter elements 53. As a result, any catalyst particles accumulated on the filtration media 53b are removed, fed into the return line 34b together with the backwash liquid, and then returned to the slurry bed inside the reactor 30 together with the backwash liquid.

The light liquid hydrocarbons fed into the external catalyst separator 34 as the backwash liquid are hydrocarbons that exist in a gaseous state under the conditions inside the reactor main unit 80, and because the inside of the external catalyst separator 34 is under basically the same conditions as those inside the reactor main unit 80, the light liquid hydrocarbons introduced into the external catalyst separator 34 are heated and start to vaporize. However, because the light liquid hydrocarbons used as the backwash liquid are hydrocarbons having a comparatively high boiling point collected by gas-liquid separation in the first drum 84, and have also been imparted with significant cold energy by secondary cooling in the secondary cooling unit 94 (secondary cooling step), they are able to retain their liquid state for some time following introduction into the external catalyst separator 34. Accordingly, by maintaining the hydrocarbons in a liquid state during the backwash treatment of the filter 52, enabling the hydrocarbons to function satisfactorily as a backwash liquid, the catalyst particles that have accumulated on the filtration media 53b during filtering of the slurry can be favorably removed from the filtration media 53b.

The catalyst particles that are returned to the slurry bed inside the reactor main unit 80 together with the backwash liquid form a slurry in combination with the other catalyst particles in the slurry bed.

Meanwhile, the light liquid hydrocarbons used as the backwash liquid are converted to gases inside the reactor main unit 80, and are discharged from the gas phase portion of the reactor main unit 80 and supplied to the gas-liquid separator 36. The first line 90 connected to the first drum 84 is connected to the merged line of the second line 91 and the third line 92 via the dashed line portion of the line 90 shown in FIG. 2, and by controlling the switching of a switching valve (not shown in the drawing) or the like, the direction of flow of the liquid (light liquid hydrocarbons) can be switched so as to flow either toward the backwash liquid vessel 38 or toward the first fractionator 40. Accordingly, when the amount of light liquid hydrocarbons flowing through the reaction system as the backwash liquid becomes excessive, the excess fraction can be discharged to the first fractionator 40.

The first fractionator 40 fractionally distills the heavy liquid hydrocarbons supplied from the reactor 30 via the external catalyst separator 34 and the filtration unit 45, and the light liquid hydrocarbons supplied via the gas-liquid separator 36 in the manner described above, and separates the hydrocarbons into a naphtha fraction (with a boiling point that is lower than approximately 150° C.), a middle distillate (with a boiling point of approximately 150 to 360° C.), and a wax fraction (with a boiling point exceeding approximately 360° C.). The liquid hydrocarbons of the wax fraction (mainly hydrocarbons of $C_{22}$ or more) discharged from the bottom of the first fractionator 40 are transported into the wax fraction hydrocracking reactor 60, the liquid hydrocarbons of the middle distillate (mainly $C_{11}$ to $C_{21}$ hydrocarbons) discharged from the middle portion of the first fractionator 40 are transported into the middle distillate hydrotreating reactor 61, and the liquid hydrocarbons of the naphtha fraction (mainly $C_5$ to $C_{10}$ hydrocarbons) discharged from the top of the first fractionator 40 are transported into the naphtha fraction hydrotreating reactor 62.

The wax fraction hydrocracking reactor 60 hydrocracks the liquid hydrocarbons of the high-carbon number wax fraction (hydrocarbons of approximately $C_{22}$ or more) discharged from the bottom of the first fractionator 40, by using the hydrogen gas supplied from the above hydrogen separator 26 to reduce the carbon number to $C_{21}$ or less. In this hydrocracking reaction, C—C bonds of hydrocarbons with a large carbon number are cleaved by the action of catalysts and heat, thereby producing lower molecular weight hydrocarbons with a smaller carbon number. The products including the liquid hydrocarbons produced by hydrocracking within the wax fraction hydrocracking reactor 60 are separated into a gas and a liquid by the gas-liquid separator 63, and the separated liquid hydrocarbons are fed into the second fractionator 70, while the gas fraction (including hydrogen gas) is fed into the middle distillate hydrotreating reactor 61 and the naphtha fraction hydrotreating reactor 62.

The middle distillate hydrotreating reactor 61 hydrotreats the liquid hydrocarbons of the middle distillate having a mid-range carbon number (of approximately $C_{11}$ to $C_{21}$) that have been supplied from the middle portion of the first fractionator 40, using hydrogen gas supplied from the hydrogen separator 26 via the wax fraction hydrocracking reactor 60. In this hydrotreating reaction, in order to obtain branched saturated hydrocarbons, mainly for the purpose of improving the low-temperature fluidity of the product for use as a base stock for fuel oils, the liquid hydrocarbons are subjected to hydroisomerization, and the unsaturated hydrocarbons contained within the liquid hydrocarbons are saturated by the addition of hydrogen. Moreover, the oxygen-containing compounds such as alcohols contained with the hydrocarbons are hydrogenated and converted to saturated hydrocarbons. The product including the hydrotreated liquid hydrocarbons obtained in this manner is separated into a gas and a liquid in the gas-liquid separator 64, and the thus separated liquid hydrocarbons are fed into the second fractionator 70, while the gas fraction (including hydrogen gas) is reused for the above hydrogenation reactions.

The naphtha fraction hydrotreating reactor 62 hydrotreats the liquid hydrocarbons of the naphtha fraction having a low carbon number (of approximately $C_{10}$ or less) supplied from the top of the first fractionator 40, using hydrogen gas supplied from the hydrogen separator 26 via the wax fraction hydrocracking reactor 60. As a result, the unsaturated hydrocarbons and oxygen-containing compounds such as alcohols contained within the supplied naphtha fraction are converted to saturated hydrocarbons. The product including the hydrotreated liquid hydrocarbons obtained in this manner is separated into a gas and a liquid in the gas-liquid separator 65, and the separated liquid hydrocarbons are fed into the naphtha stabilizer 72, while the gas fraction (including hydrogen gas) is reused for the above hydrogenation reactions.

Subsequently, the second fractionator 70 fractionally distills the liquid hydrocarbons supplied from the wax fraction hydrocracking reactor 60 and the middle distillate hydrotreating reactor 61 in the manner described above, and separates the hydrocarbons into hydrocarbons with a carbon number of $C_{10}$ or less (with boiling points lower than approximately 150° C.), a kerosene fraction (with a boiling point of approximately 150 to 250° C.), a gas oil fraction (with a boiling point of approximately 250 to 360° C.) and an uncracked wax fraction (with a boiling point exceeding approximately 360° C.) from the wax fraction hydrocracking reactor 60. The gas oil fraction is discharged from the bottom section of the second fractionator 70, and the kerosene fraction is discharged from the middle portion of the second fractionator 70. Meanwhile, hydrocarbons with a carbon number of $C_{10}$ or less are discharged from the top of the second fractionator 70 and supplied to the naphtha stabilizer 72.

In the naphtha stabilizer 72, the hydrocarbons with a carbon number of $C_{10}$ or less supplied from the naphtha fraction hydrotreating reactor 62 and the second fractionator 70 are distilled, and naphtha ($C_5$ to $C_{10}$) is separated and refined as a product. Thus, a high-purity naphtha is discharged from the bottom of the naphtha stabilizer 72. Meanwhile, a flare gas containing mainly hydrocarbons with a carbon number no higher than a predetermined value (typically no higher than $C_4$), namely hydrocarbons other than the targeted product, is discharged from the top of the naphtha stabilizer 72. This flare gas is transported to an external combustion facility (a flare stack, not shown in the drawings), where it is combusted and then discharged into the atmosphere.

In the method for producing hydrocarbons according to the present embodiment, light liquid hydrocarbons discharged from the gas phase portion of the reactor main unit 80 are used as the liquid hydrocarbons that are flushed through the filter 52 in the backwash step (backwash treatment), and therefore the problem of liquid hydrocarbons (heavy liquid hydrocarbons) passing repeatedly back and forth through the filter 52 can be eliminated. In other words, even though the light liquid hydrocarbons are returned to the inside of the reactor main unit 80 in the backwash step, they are subsequently vaporized inside the reactor main unit 80 and discharged from the gas phase portion of the reactor main unit 80 rather than passing through the filter 52, meaning they do not flow through the filter 52 as part of the slurry. Accordingly, the problem of heavy liquid hydrocarbons flowing repeatedly back and forth through the filter 52 can be eliminated, allowing the load on the filter 52 to be reduced by lowering the amount of slurry filtered through the filter 52 per unit of time, and as a result, the filtration surface area can be reduced and the production equipment can be reduced in size and simplified.

Further, the gas components discharged from the gas phase portion of the reactor 30 are cooled by the heat exchanger 83 to a temperature of not less than 180° C. but lower than the temperature inside the reactor main unit 80 in order to obtain the light liquid hydrocarbons, and therefore when these light liquid hydrocarbons are fed into the external catalyst separator 34 as a backwash liquid, they can be maintained in the liquid state for some time, enabling them to function favorably as the backwash liquid.

Furthermore, because the light liquid hydrocarbons are cooled even further by the secondary cooling unit 94 (secondary cooling step), the time for which the hydrocarbons can be maintained in the liquid state during the backwash step can be lengthened, enabling the hydrocarbons to function even more effectively as the backwash liquid.

Next is a description of a second embodiment of the method for producing hydrocarbons according to the present invention, based on a method for synthesizing hydrocarbons by the FT synthesis reaction.

This embodiment differs from the first embodiment described above in that a mixed liquid prepared by mixing heavy liquid hydrocarbons with the light liquid hydrocarbons is used as the backwash liquid.

In other words, in the present embodiment, in a similar manner to that described above for the first embodiment, the light liquid hydrocarbons discharged through the first line 90 are fed into the vessel 93, subjected to secondary cooling to a predetermined temperature in the secondary cooling unit 94, and then fed into the backwash liquid vessel 38. Meanwhile, the valve 47 in the first line 41 is used to introduce a portion of the heavy liquid hydrocarbons discharged from the external catalyst separator 34 into the backwash liquid vessel 38. As a result, the light liquid hydrocarbons from the gas components discharged from the gas phase portion of the reactor main unit 80 and a portion of the heavy liquid hydrocarbons discharged from the external catalyst separator 34 are mixed, yielding a liquid for the backwash treatment, namely a backwash liquid, composed of the mixture (mixed oil).

The mixing ratio of the light liquid hydrocarbons and heavy liquid hydrocarbons within the backwash liquid can be appropriately controlled by using the valve 47 to adjust the amount of the heavy liquid hydrocarbons introduced into the backwash liquid vessel 38. Further, although there are no particular limitations on the mixing ratio that is controlled in this manner, namely the ratio of the amount of heavy liquid hydrocarbons relative to the amount of light liquid hydrocarbons, the ratio is preferably within a range from approximately 8:2 to 2:8. By increasing the amount of light liquid hydrocarbons within the mixture, the amount of heavy liquid hydrocarbons can be reduced accordingly, and this means that the amount of heavy liquid hydrocarbons passing repeatedly back and forth through the filter 52 of the external catalyst separator 34 can be reduced. In contrast, if the amount of heavy liquid hydrocarbons is increased, then because these heavy liquid hydrocarbons remain in a liquid state inside the external catalyst separator 34, the washing action (backwash action) of the backwash liquid composed of the mixture can be enhanced.

A backwash treatment (backwash step) using this type of backwash liquid may be performed in the same manner as that described above for the first embodiment. In other words, the backwash treatment may be performed by flowing the backwash liquid (mixed liquid), which is discharged from the backwash liquid vessel 38 via the second line 44, through the third line 57 shown in FIG. 3A and into the filter elements 53. As a result, the catalyst particles accumulated on the filtration media 53b are removed from the filtration media 53b, fed into the return line 34b together with the backwash liquid, and then returned to the slurry bed inside the reactor 30 together with the backwash liquid.

The light liquid hydrocarbons within the backwash liquid introduced into the external catalyst separator 34 are hydrocarbons that exist in a gaseous state under the conditions inside the reactor main unit 80, and are therefore heated and start to vaporize upon introduction into the external catalyst separator 34. However, because the light liquid hydrocarbons used in the backwash liquid are hydrocarbons having a comparatively high boiling point collected by gas-liquid separation in the first drum 84, and have also been imparted with significant cold energy by secondary cooling in the secondary cooling unit 94 (secondary cooling step), they are able to retain their liquid state for some time following introduction into the external catalyst separator 34. Accordingly, by maintaining these light liquid hydrocarbons in a liquid state during the backwash treatment of the filter 52, enabling the hydrocarbons to function satisfactorily as a backwash liquid, the mixed liquid containing these light liquid hydrocarbons and the heavy liquid hydrocarbons is able to favorably remove the catalyst particles accumulated on the filtration media 53b.

The catalyst particles that are returned to the slurry bed inside the reactor 30 together with the backwash liquid form a slurry in combination with the other catalyst particles in the slurry bed. Further, the heavy liquid hydrocarbons within the backwash liquid, together with other heavy liquid hydrocarbons in the slurry, are transported into the external catalyst separator 34 and pass through the filter 52 once again during the filtration treatment.

Meanwhile, the light liquid hydrocarbons within the backwash liquid are converted to gases inside the reactor main unit 80, and are discharged from the gas phase portion of the reactor main unit 80 and supplied to the gas-liquid separator 36.

In the method for producing hydrocarbons according to this embodiment, light liquid hydrocarbons discharged from the gas phase portion of the reactor main unit 80 are used within the liquid hydrocarbons that are flushed through the filter 52 in the backwash step (backwash treatment), and therefore the amount of liquid hydrocarbons (heavy liquid hydrocarbons) that are passed repeatedly back and forth through the filter 52 can be reduced. In other words, even though the light liquid hydrocarbons are returned to the inside of the reactor 30 in the backwash step, they are subsequently vaporized inside the reactor 30 and discharged from the gas phase portion of the reactor 30 rather than passing through the filter 52, meaning they do not flow through the filter 52 as part of the slurry. Accordingly, the amount of liquid hydrocarbons flowing repeatedly back and forth through the filter 52 can be reduced, allowing the load on the filter 52 to be reduced by lowering the amount of slurry filtered through the filter 52 per unit of time, and as a result, the filtration surface area can be reduced and the production equipment can be reduced in size and simplified.

Further, because a mixture (mixed oil) containing light liquid hydrocarbons and heavy liquid hydrocarbons discharged from the reactor 30 is used as the backwash liquid, the heavy liquid hydrocarbons, in particular, do not vaporize during the backwash, allowing the backwash liquid to exhibit a particularly good washing action, and therefore the filter 52 can be washed favorably.

Furthermore, in the second embodiment described above, the heavy liquid hydrocarbons discharged from the reactor main unit 80 by the filtration through the filter 52 inside the external catalyst separator 34 are filtered a second time in the filtration unit 45 to remove at least a portion of any powdered catalyst particles contained within the heavy liquid hydrocarbons, and therefore when these heavy liquid hydrocarbons are passed back through the filter 52 as part of the backwash liquid, the possibility of catalyst particles contained within the backwash liquid blocking the filter 52 from the opposite direction to that of the filtration treatment can be largely avoided.

Figure 4:
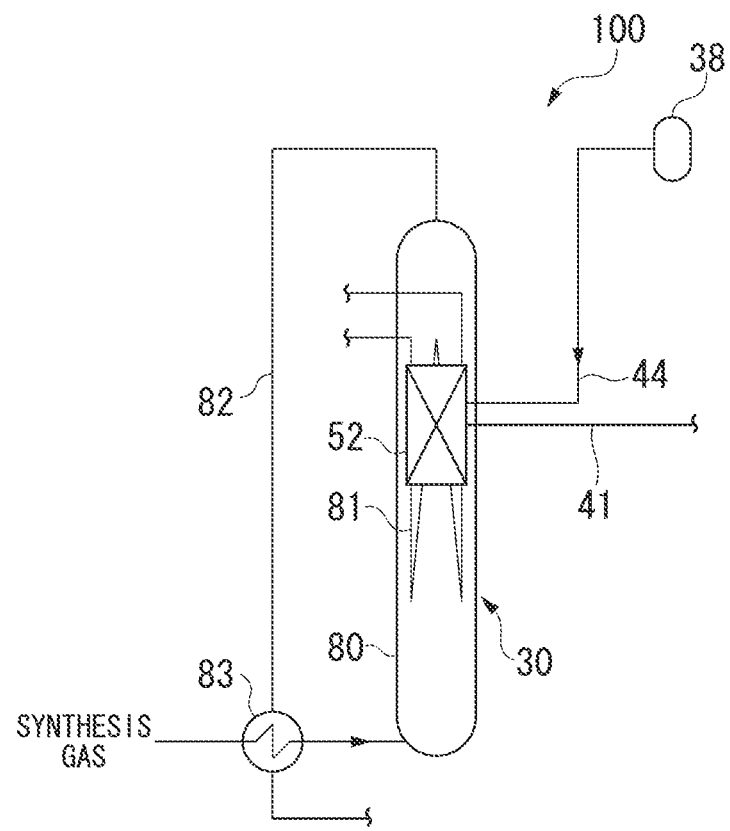
FIG. 4 is a schematic structural diagram illustrating a modification of the FT synthesis unit according to the present invention.

In the embodiments described above, the production method of the present invention is executed using an FT synthesis unit 5 in which the filter 52 for filtering the slurry is disposed inside the separation vessel 50 of the external catalyst separator 34, but the present invention is not limited to this particular configuration, and for example, hydrocarbons may also be produced using an FT synthesis unit 100 illustrated in FIG. 4, which is provided with an internal catalyst separation mechanism in which the filter 52 is provided inside the reactor 30.

The FT synthesis unit 100 illustrated in FIG. 4 differs from the FT synthesis unit 5 illustrated in FIG. 2 in that instead of providing the external catalyst separator 34, the filter 52 is provided inside the reactor 30, forming an internal catalyst separation mechanism inside the reactor 30. This catalyst separation mechanism relies mainly on a filter 52 having the same structure as the filter 52 provided inside the separation vessel 50 of the external catalyst separator 34 illustrated in FIG. 2, and is provided with the filter elements 53, the first line 54, the second line 55, the third line 57 and the valves 56 and 58 illustrated in FIG. 3A and FIG. 3B.

Even when the FT synthesis unit 100 having a reactor 30 provided with this type of internal catalyst separation mechanism is used, the problem of heavy liquid hydrocarbons passing repeatedly back and forth through the filter 52 as the backwash liquid can either be eliminated, or the amount of the heavy liquid hydrocarbons can be significantly reduced, in the same manner as that described above for the FT synthesis unit 5 illustrated in FIG. 2 having the reactor 30 that uses the external catalyst separator 34. Accordingly, the load on the filter 52 can be reduced, meaning the filtration surface area can be reduced and the production equipment can be reduced in size and simplified.

A unit that combines external and internal mechanisms may also be used as the catalyst separation mechanism in the FT synthesis unit used for executing the production method of the present invention. In other words, the production method of the present invention may be executed using an FT synthesis unit that includes both the external catalyst separator 34 illustrated in FIG. 2 and the filter 52 disposed inside the reactor 30 illustrated in FIG. 4.

Moreover, in the present invention, the heavy liquid hydrocarbons discharged from the reactor 30 and passed through the filtration treatment may be supplied directly to the backwash liquid vessel 38 or the first fractionator 40, without being subjected to a treatment for removing at least a portion of any powdered catalyst particles contained within the heavy liquid hydrocarbons.

Further, in the embodiments described above, a portion of the filter elements 53 of the filter 52 are used for performing filtration, while the remaining filter elements 53 are subjected to the backwash treatment, meaning the filtration treatment and the backwash treatment are performed simultaneously in parallel, but the filtration treatment and the backwash treatment need not necessarily be performed simultaneously, and may also be performed alternately.

Moreover, in the embodiments described above, a natural gas is used as the hydrocarbon feedstock that is supplied to the liquid fuel synthesis system 1, but other hydrocarbon feedstocks such as asphalt and residual oils may also be used.

Further, the above embodiments describe configurations in which the production method of the present invention is executed using the liquid fuel synthesis system 1, but the present invention can be applied to any method for producing hydrocarbons that synthesizes hydrocarbons via contact between a synthesis gas containing at least hydrogen gas and carbon monoxide as the main components, and a slurry containing catalyst particles.

While embodiments of the present invention have been described above with reference to the drawings, the specific configuration of the invention is not limited to these embodiments, and various design changes or the like are possible without departing from the scope of the present invention.

INDUSTRIAL APPLICABILITY

The present invention relates to a method for producing hydrocarbons by the Fischer-Tropsch synthesis reaction using a slurry bubble column reactor. According to the present invention, the production equipment can be reduced in size and simplified, and the amount of maintenance required for the equipment can be reduced.

DESCRIPTION OF THE REFERENCE SIGNS

1: Liquid fuel synthesis system
5: FT synthesis unit
30: Slurry bubble column reactor (reactor)
34: External catalyst separator
36: Gas-liquid separator
38: Backwash liquid vessel
40: First fractionator
52: Filter
46: Filtration unit
82: Discharge line
83: Heat exchanger
90: First line
94: Secondary cooling unit

The invention claimed is:

1. A method for producing hydrocarbons, the method comprising:
a synthesis step of synthesizing hydrocarbons by a Fischer-Tropsch synthesis reaction, using a slurry bubble column reactor having a slurry comprising catalyst particles and liquid hydrocarbons retained inside the reactor, and having a gas phase portion located above the slurry,
a discharging step of passing the slurry through a filter positioned inside and/or outside the reactor, thereby separating catalyst particles and heavy liquid hydrocarbons, and discharging the heavy liquid hydrocarbons, the heavy liquid hydrocarbons being discharged from the reactor as liquid,
a backwash step of flushing liquid hydrocarbons through the filter in an opposite direction to a flow direction of the slurry, thereby returning catalyst particles accumulated on the filter to the slurry bed inside the reactor, and
a cooling and gas-liquid separation step of cooling hydrocarbons discharged from the gas phase portion of the reactor that are gaseous under conditions inside the reactor to a temperature that is at least 180° C. but is lower than a temperature inside the reactor, and then separating condensed light liquid hydrocarbons from gas components and collecting the condensed light liquid hydrocarbons, the condensed light liquid hydrocarbons being discharged from the reactor as gas, wherein
the liquid hydrocarbons that are flushed through the filter in the backwash step are a mixture of the light liquid hydrocarbons obtained in the cooling and gas-liquid separation step and the heavy liquid hydrocarbons discharged in the discharging step.

2. The method for producing hydrocarbons according to claim 1, further comprising a secondary cooling step of further cooling the light liquid hydrocarbons, wherein the light liquid hydrocarbons obtained from the secondary cooling step are supplied to the backwash step.

3. The method for producing hydrocarbons according to claim 1, wherein the heavy liquid hydrocarbons within the mixture are hydrocarbons from which at least a portion of catalyst particles contained within the heavy liquid hydrocarbons discharged in the discharging step have been removed.

* * * * *